United States Patent
Ikonomopoulos et al.

(10) Patent No.: US 9,195,625 B2
(45) Date of Patent: Nov. 24, 2015

(54) INTERCONNECT CONTROLLER FOR A DATA PROCESSING DEVICE WITH TRANSACTION TAG LOCKING AND METHOD THEREFOR

(75) Inventors: Gus P. Ikonomopoulos, Lakeway, TX (US); Thang Q. Nguyen, Austin, TX (US); Jose M. Nunez, Austin, TX (US); Kun Xu, Austin, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 1560 days.

(21) Appl. No.: 12/608,525

(22) Filed: Oct. 29, 2009

(65) Prior Publication Data
US 2011/0107065 A1    May 5, 2011

(51) Int. Cl.
G06F 9/00       (2006.01)
G06F 13/40      (2006.01)
G06F 15/76      (2006.01)

(52) U.S. Cl.
CPC ............ *G06F 13/4022* (2013.01); *G06F 15/76* (2013.01)

(58) Field of Classification Search
None
See application file for complete search history.

(56) References Cited

U.S. PATENT DOCUMENTS

| | | | |
|---|---|---|---|
| 6,247,101 B1* | 6/2001 | Settles | 711/145 |
| 6,662,216 B1* | 12/2003 | Arimilli et al. | 709/218 |
| 7,024,520 B2 | 4/2006 | Tierney et al. | |
| 7,308,514 B1* | 12/2007 | Hewitt et al. | 710/66 |
| 2002/0065980 A1 | 5/2002 | Lasserre | |
| 2005/0114741 A1 | 5/2005 | Chen | |
| 2005/0209804 A1 | 9/2005 | Basso et al. | |
| 2006/0080819 A1 | 4/2006 | McAllister | |
| 2006/0123167 A1* | 6/2006 | Jeppsen et al. | 710/106 |
| 2009/0204974 A1* | 8/2009 | Feehrer | 719/314 |

FOREIGN PATENT DOCUMENTS

EP          0568221 A1      11/1993

* cited by examiner

*Primary Examiner* — Jacob A Petranek

(57) ABSTRACT

A data processing device includes an interconnect controller operable to manage the communication of information between modules of the data processing device via an interconnect. In response to a transaction request the interconnect controller selects a tag value from a set of available tag values, assigns the tag to the transaction and reserves the tag value so that it is unavailable for assignment to other transactions. If an expected response to the transaction request is not received within a designated amount of time, the transaction enters a timed-out state and the interconnect controller locks the tag value, so that it remains unavailable for assignment to other transactions until an unlock event, such as a request from software.

20 Claims, 4 Drawing Sheets

INTERCONNECT CONTROLLER FOR A DATA PROCESSING DEVICE WITH TRANSACTION TAG LOCKING AND METHOD THEREFOR

BACKGROUND

1. Field of the Disclosure

The present disclosure is related generally to data processing devices, and more particularly to interconnect controllers for data processing devices.

2. Description of the Related Art

Data processing devices typically include different modules to perform specified tasks. For example, a data processing device can include multiple processor cores to execute different sets of instructions. Further, a data processing device having multiple modules can employ an interconnect to communicate information between the modules. An interconnect controller manages the communication of information via the interconnect to ensure that communications are received from and routed to the appropriate modules. However, failure of a module to respond to communications in a timely fashion can reduce the efficiency of the interconnect controller, resulting in reduced performance of the data processing device.

BRIEF DESCRIPTION OF THE DRAWINGS

The present disclosure may be better understood, and its numerous features and advantages made apparent to those skilled in the art by referencing the accompanying drawings.

DETAILED DESCRIPTION

A data processing device includes an interconnect controller operable to manage the communication of information between modules of the data processing device via an interconnect. The interconnect controller receives from a first module a request, referred to as a transaction request, to communicate information to a second module of the device. In response to a transaction request, the interconnect controller can initiate a transaction by providing the request to the second module via the interconnect. The interconnect controller selects a tag value from a set of available tag values, assigns the tag to the transaction and reserves the tag value so that it is unavailable for assignment to other transactions. If an expected response to the transaction is not received within a designated amount of time, the transaction enters a timed-out state and the interconnect controller locks the tag value, so that it remains unavailable for assignment to other transactions until an unlock event, such as a request from software. By locking the tag value associated with the timed-out transaction, the interconnect controller reduces the likelihood that a late response to the timed-out transaction will be mismatched to a transaction request received at the interconnect after the time out, thereby improving communication efficiency.

Figure 1:
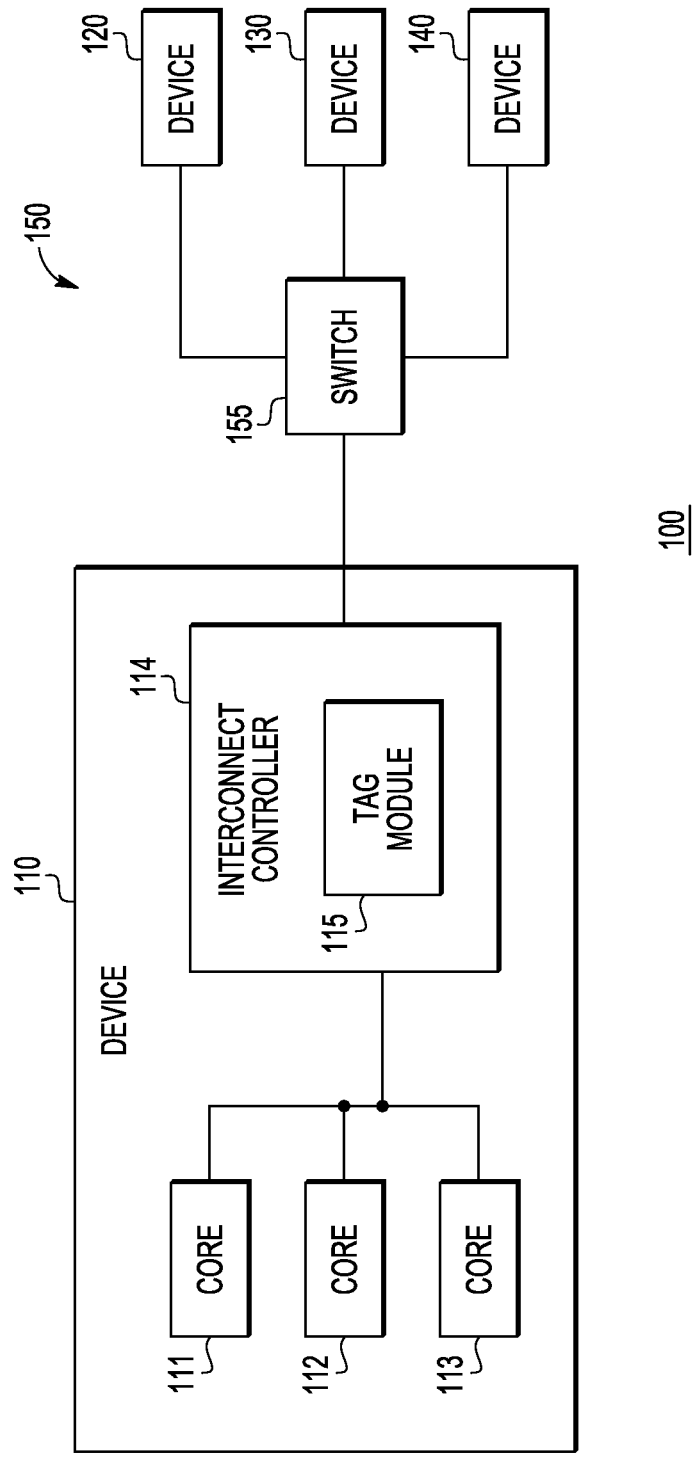
FIG. 1 is a block diagram illustrating a data processing device including an interconnect controller having a tag module in accordance with a specific embodiment of the present disclosure.

FIG. 1 is a block diagram illustrating a data processing device 100 including an interconnect controller having a tag module in accordance with a specific embodiment of the present disclosure. Data processing device 100 includes a device 110, a device 120, a device 130, and a device 140 and each device of devices 110-140 is connected to an interconnect 150. Devices 110-140 can include integrated circuit microprocessors, information storage devices, network interface devices, instrumentation devices, and the like, or a combination thereof. For the purpose of illustration, device 110 is an integrated circuit microprocessor including a processor core 111, a processor core 112, a processor core 113, and an interconnect controller 114. Interconnect controller 114 includes a tag module 115. Each processor core of processor cores 111-113 is connected to interconnect controller 114, and interconnect controller 114 has a bidirectional interface connected to interconnect 150. Interconnect 150 is illustrated to include a switch 155, but interconnect 150 can include a network, network devices, a point-to-point interconnect, or other communications infrastructure or media via which information can be transmitted.

During operation, interconnect controller 114 can receive a request, referred to as a transaction request, to exchange information with another device. For example, processor core 111 can request information that is stored at device 120. In response to the request, interconnect controller 114 communicates the request via interconnect 150, together with control information indicating the target of the communication and the like. The operation of interconnect controller 114 can be compliant with a standard or a proprietary interface protocol, such as the RapidIO protocol, PCI Express protocol, Hypertransport protocol, and the like.

Tag control module 115 is configured to associate a tag value with each received transaction request, so that interconnect controller 114 can appropriately route the response to each transaction to the requesting device. To illustrate, the tag control module 115 maintains a set of defined tag values which include a set of available tag values, a set of outstanding tag values, and a set of locked tag values. Each tag value associated with the set of available tag values is available to be assigned to a transaction request received at the interconnect controller 114. Each tag value associated with the set of outstanding tag values is associated with a transaction request that has been communicated via the interconnect 150 but for which a response has not been received and for which a designated amount of time has not yet elapsed. In an embodiment, the designated amount of time is based on a programmable value. Each tag value associated with the set of locked tag values is associated with a transaction request that has been communicated via the interconnect 150 but for which a response has not been received and for which a designated amount of time has not yet elapsed. In an embodiment, the designated amount of time is based on a programmable value. Locked tag values and outstanding tag values are exclusive of the set of available tag values, so that a tag value associated with the set of locked tag values or associated with the set of outstanding tag values is not associated with the set of available tag values. The interconnect controller 114 manages the state of each received transaction request by changing the set associated with the tag value of the request.

For example, in response to receiving a transaction request, referred to for purposes of discussion as REQUEST1, from a requesting device the interconnect controller 114 selects a tag value, referred to for purposes of discussion as TAG1, from the set of available tag values and assigns the selected tag value to REQUEST1. The interconnect controller 114 further associates the value TAG1 with the set of outstanding tag values. Accordingly, if a second request, referred to as REQUEST2, is received at interconnect controller 114 while TAG1 is associated with the set of outstanding tag values, TAG1 will not be available for assignment to REQUEST1.

Interconnect controller 115 communicates REQUEST1 to the interconnect 150, and monitors the amount of time REQUEST1 has been pending without receiving a response. If a response to REQUEST1 is received within a defined or programmable amount of time, the interconnect controller 114 provides the response to the requesting device and associates TAG1 with the set of available tag values, so that it is available for assignment to subsequently received requests. If a response is not received within the defined or programmable amount of time, the interconnect controller 114 provides a notification to the requesting device that a time-out error has occurred for REQUEST1. In addition, the interconnect controller 114 associates TAG1 with the set of locked tag values, so that TAG1 is not available for assignment to transaction requests received while the tag value is locked.

Locking the tag value so that it is unavailable for assignment while locked reduces the likelihood that a response to REQUEST1 received after the time-out error will result in a mismatched response. To illustrate, assume that interconnect controller 114 immediately associates TAG1 with the set of available tags in response to determining REQUEST1 has timed out. In addition, assume that REQUEST2 is subsequently received and assigned the tag value TAG1. If a response to REQUEST1 is received after TAG1 has been assigned to REQUEST2, the interconnect controller 114 will assume that the response is to REQUEST2, and will provide the response to the device that initiated REQUEST2. Thus, the response will be not be matched to the appropriate request. Accordingly, by associating the tag TAG1 with the set of locked tag values, so that it is unavailable for assignment to transaction requests, interconnect controller 114 is able to notify the requesting device of a timeout error while reducing the likelihood of a request-response mismatch. The operation of tag module 115 can be better understood with reference to FIG. 2.

Figure 2:
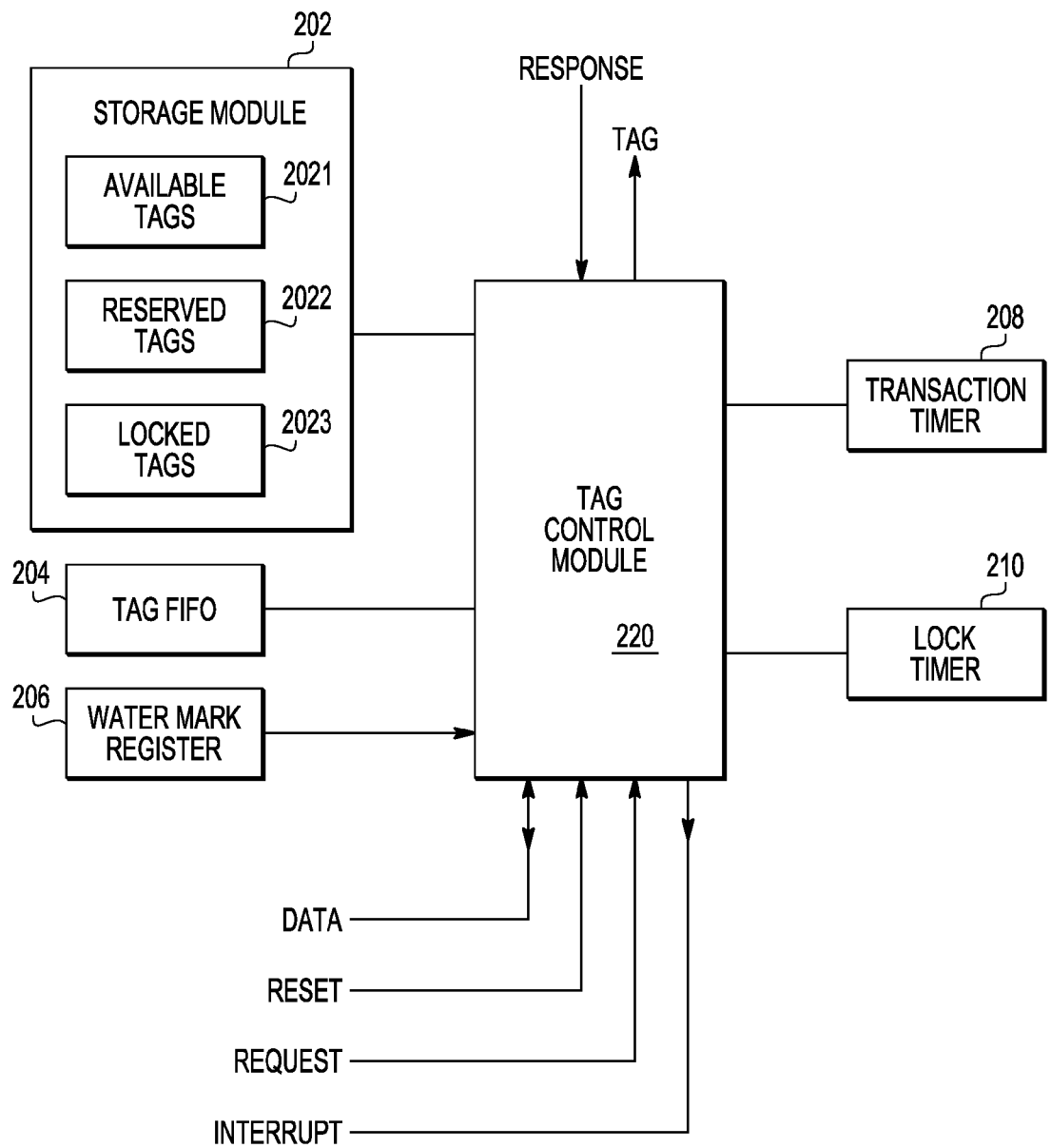
FIG. 2 is a block diagram illustrating the tag module of FIG. 1 in accordance with a specific embodiment of the present disclosure.

FIG. 2 is a block diagram illustrating tag module 115 of FIG. 1 in accordance with a specific embodiment of the present disclosure. Tag module 115 includes a storage module 202, a tag FIFO 204, a watermark register 206, a transaction timer 208, a lock timer 210, and a tag control module 220. Storage module 202 includes an available tags register 2021, a reserved tags register 2022, and a locked tags register 2023.

Tag control module 220 has an input to receive a signal labeled REQUEST, an input to receive a signal labeled RESET, a bidirectional input/output labeled DATA, an output to provide a signal labeled INTERRUPT, an output to provide a signal labeled TAG, and an input to receive a signal labeled RESPONSE. Tag control module is also connected to storage module 202, tag FIFO 204, watermark register 206, transaction timer 208, and lock timer 210.

Signal REQUEST can be provided by a processor core, such as processor core 111 of FIG. 1, and is used to communicate a request for interconnect controller 114 to perform a read transaction to retrieve information from another device, such as device 120, or to perform a write transaction to store information at another device. The recipient of the request can respond with the requested information in the case of a read transaction, and may be configured to respond with an acknowledgement that the transaction was completed in the case of a write operation. An indication of a response, if any, is communicated to tag control module 220 via signal RESPONSE. When a transaction requires a response, tag control module 220 can provide a tag value via signal TAG, and interconnect controller 114 can associate the tag with the transaction. Responses received at interconnect controller 114 can include the corresponding tag value so that interconnect controller 114 can determine for which transaction the response is associated.

A processor core, such as processor core 111 of FIG. 1 can access information stored at tag control module 220 or store information at tag control module 220 via signal DATA. For example, processor core 111 can access tag control module 220 to determine which tags are currently locked, and to unlock one or more tags. A processor core, or another module (not shown) at device 110 can assert signal RESET, which can initialize tag control module 220 to a known state. For example, in an embodiment, the assertion of signal RESET can unlock all locked tags maintained at tag module 115.

Storage module 202 is configured to maintain status information associated with a set of tag values. In an embodiment, there is a defined number of tag values in the set, such as 16, 32, 1024, or another number. Each tag value of the set of tag values can be further associated with a set of available tag values, a set of reserved tag values, and a set of locked tag values. In an embodiment, the set of available tags, the set of reserved tags, and the set of locked tags are mutually exclusive wherein each tag value can be associated with only one of the three sets. Available tags register 2021 identifies tags associated with the set of available tags values and that are available for association with a new transaction. Reserved tags register 2022 identifies tags associated with the set of reserved tag values, which have been assigned to a transaction that is currently outstanding (no response has yet been received). Locked tags register 2023 identifies tags associated with the set of locked tag values.

The registers at storage module 202 can be accessed by a device to determine the state of each tag at a particular time, or to modify the state of a tag. For example, processor core 111 can perform a read operation at storage module 202 to determine whether a tag is currently associated with the set of available tags, the set of reserved tags, or the set of locked tags. Processor core 111 can also perform a write operation at storage module 202 to assign a tag to a particular set. In an embodiment, a logic-high value can be stored at a location at locked tags register 2023 to indicate that a corresponding tag is locked, and a logic-low value can be stored at a location at locked tags registers 2023 to indicate that the corresponding tag is unlocked.

The number of outstanding transactions is limited to the total number of tags implemented at tag module 115. For example, if tag module 115 maintains thirty-two tags, and thirty-two transactions are outstanding, a subsequent transaction request cannot be initiated until an outstanding transaction has completed and the associated tag is removed from the set of reserved tags. Note that if a tag value is associated with more than one outstanding transaction, interconnect controller 114 would be unable to determine to which of multiple transaction requests a particular response corresponds. Therefore, a tag is generally not returned to the set of available tags until a corresponding response is received.

When a transaction request is received at tag control module 220 and at least one tag is available (a tag included in the available set of tags identified by available tags register 2021), tag control module 220 provides the available tag to interconnect controller 114 via signal TAG, removes the tag from the set of available tags, and adds the tag to the set of reserved tags. Interconnect controller 114 initiates a transaction and associates the tag with the transaction. If a response to the transaction is received at interconnect controller 114 (which includes the original tag), tag control module 220 is notified via signal RESPONSE that the particular transaction has completed, and tag control module 220 reassigns the tag from the reserved set of tags back to the available set of tags.

If a response to the transaction is not received within a predetermined amount of time after the transaction is initiated, the transaction is designated as delinquent (a transaction time-out has occurred). Transaction timer 208 is configured to maintain a record of all outstanding transactions and indicate when a response to each outstanding transaction has not been received in a timely manner. When a transaction is determined to be delinquent, the tag associated with that transaction is assigned to the locked set of tags (and optionally removed from the reserved set of tags). A transaction may become delinquent due to an error condition at interconnect 150, an error condition at the designated recipient of the transaction, or another error condition. A transaction may also become delinquent if the recipient of the request is excessively slow to respond to the transaction such as when the recipient is busy with another activity. In the latter case, a response to the transaction may still be received after tag control module 220 has locked the tag associated with the transaction.

If an excessive number of tags are locked, the ability of interconnect controller 114 to support all received transaction requests can be impaired, since a reduced number of outstanding transactions can be supported. For example, if all tags are locked, a new transaction cannot be initiated in response to a received transaction request. Accordingly, in one embodiment, a device, such as processor core 111 can monitor the number of locked tags by reading the contents of locked tags register 2023. If processor 111 determines that an excessive number of tags are locked, processor core 111 can take suitable action to invalidate an outstanding transaction and unlock the corresponding tag by reassigning the tag from the locked set of tags to the available set of tags.

In another embodiment, tag control module 220 can assert signal INTERRUPT when a tag is locked, and an interrupt service routine administered by device 110 can determine a cause of the delinquent transaction, perform a suitable invalidation procedure, shut down non-functional devices, or the like. Having responded to the error condition, the interrupt service routine can unlock the tag associated with the delinquent transaction.

In still another embodiment, tag module 115 can monitor how long each locked tag has been locked using lock timer 210. When tag control module 220 locks a tag, the tag value can be recorded at tag FIFO 204 along with time information maintained at lock timer 210. Tag FIFO 204 is configured to store all locked tags in the order in which they were locked. Tag FIFO 204 can be implemented using a first-in first-out register stack whereby the least recent entry and next available entry are indicated by register pointers (not shown). For example, at any point in time, tag FIFO 204 can identify each locked tag and how long the tag has been locked, ranging from the tag that has been locked the longest to the tag that was locked most recently. The length of time that a tag has been locked can be determined by comparing the time value associated with the locked tag and the current time value maintained at lock timer 210. As additional tags are locked by tag module 115, the corresponding tag values are stored at tag FIFO 204. When a tag is unlocked (and returned to the available set of tags), the corresponding tag value is removed from tag FIFO 204.

In an embodiment, the tag that has been locked for the longest amount of time can be the first to be unlocked since it may be assumed that a response to the transaction request associated with that tag is less likely to be received at tag control module 220 relative to a transaction request associated with a more recently locked tag. In another embodiment, a determination of which tag may be unlocked can be based on an expected latency of each transaction recipient. For example, a device that is systematically slow to respond to a transaction request may be provided with additional time to respond before the associated tag is unlocked compared to a device that is known to respond quickly. Furthermore, the originator of a transaction request, such as processor core 111 can attempt to communicate with a device that is not responding to a transaction request to determine an explanation for the overdue response. For example, processor core 111 may determine that a device that is delinquent in its response is over-loaded by excessive transaction requests, but the request associated with the locked tag remains in queue and a response is forthcoming. In an embodiment, a processor core, such as processor core 111, can access tag FIFO 204 to determine how many tags are locked and for how long each tag has been locked, and initiate a suitable invalidation. Processor core 111 can then access storage module 202 or tag FIFO 204 and explicitly unlock one or more tags.

In still another embodiment, tag control module 220 can undertake preemptive action to unlock tags based on the number of locked tags recorded at tag FIFO 204 and a predetermined value stored at watermark register 206. For example, watermark register 206 can include a programmable value indicating a maximum number of tags that can be locked at any given time. When tag control module 220 determines that tag FIFO 204 contains a number of locked tags equal to a threshold indicated by watermark register 206, tag control module 220 can autonomously unlock a select number of locked tags based on an assumption that corresponding responses will not be forthcoming. The number of tags that are unlocked can be configurable. Alternatively, tag control module 220 can assert signal INTERRUPT to alert the device that originated the transaction request or to alert another device responsible for maintaining efficient operation of interconnect controller 114 so that the request can be invalidated. The originating device can then unlock the associated tag or request that tag control module 220 unlock the tag.

Figure 3:
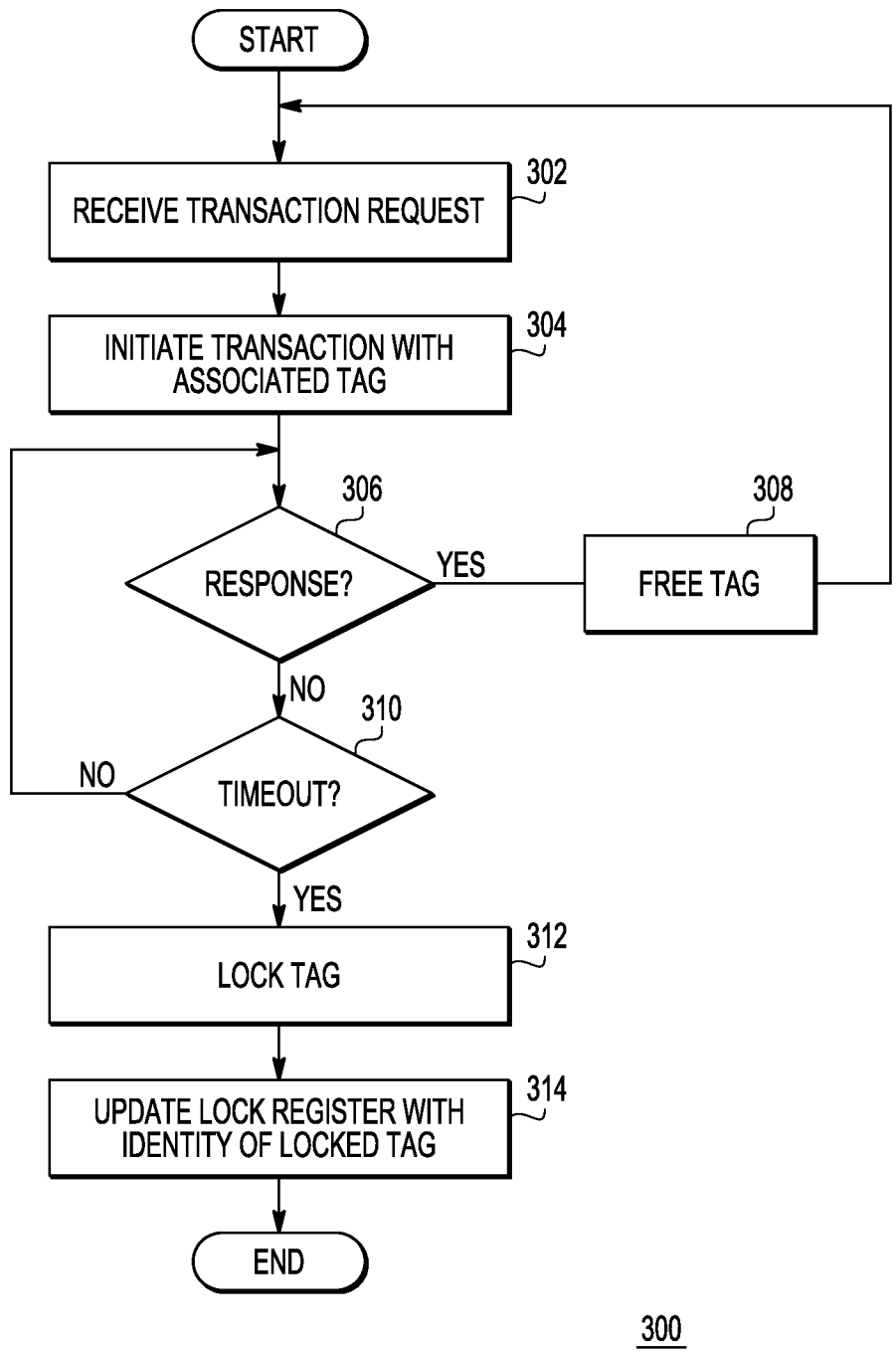
FIG. 3 is a flow diagram illustrating a method for locking a tag in accordance with a specific embodiment of the present disclosure.

FIG. 3 is a flow diagram illustrating a method 300 for locking a tag in accordance with a specific embodiment of the present disclosure. Method 300 begins at block 302 where a transaction request is received at interconnect controller 114. For example, processor core 111 may request information that is stored at device 120. The flow proceeds to block 304 where interconnect controller 114 initiates a transaction. Tag module 115 provides a tag, which is selected from a set of available tag values and this tag is associated with the transaction. The tag is unique to the transaction and a response to the transaction can include this tag so that interconnect controller 114 can match each response with a corresponding transaction. When tag control module 220 assigns an available tag to a transaction, the tag is associated with a set of reserved tags, and optionally removed from the set of available tags.

The flow proceeds to decision block 306 where interconnect controller 114 determines if a response to the transaction has been received. If a response is received, the flow proceeds to block 308 where the tag is removed from the set of reserved tags (and is thus available to be re-used with a subsequent transaction. The flow returns to block 302. If, however, no response is received, the flow proceeds to decision block 310 where tag control module 220 determines whether a response to the transaction is overdue based on time information maintained at transaction timer 208. If a response to the transaction is not yet delinquent, the flow returns to decision block 306 where interconnect controller 114 continues to wait for a response. Alternatively, if no response has been received before a predetermined amount of time has expired, the flow proceeds to block 312 where tag control module 220 locks the tag associated with the transaction by associating the tag with a set of locked tags. The flow proceeds to block 314 where tag control module updates information at storage module 202 to indicate that the tag has been locked.

Figure 4:
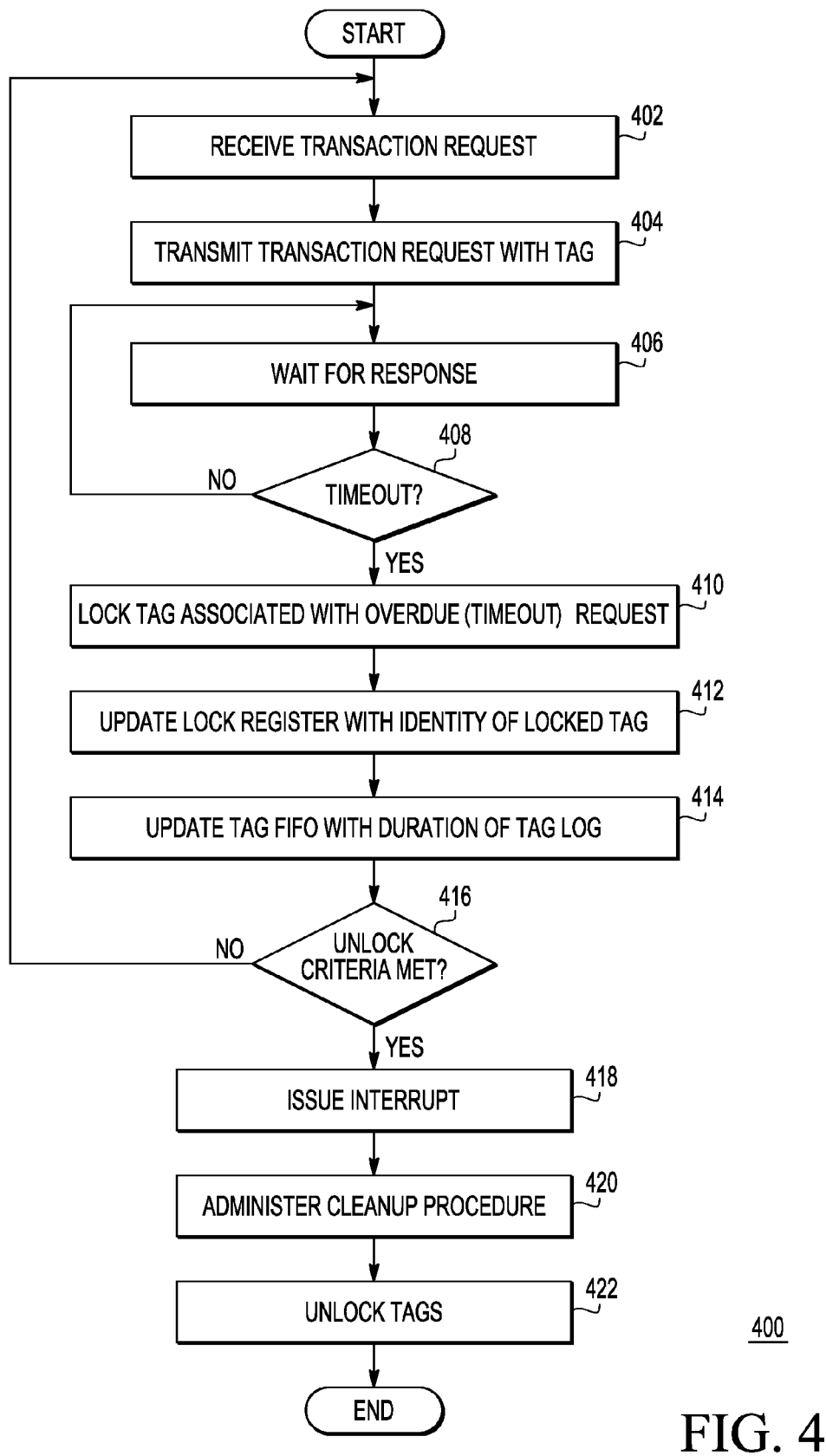
FIG. 4 is a flow diagram illustrating a method for unlocking a tag in accordance with a specific embodiment of the present disclosure.

FIG. 4 is a flow diagram illustrating a method 400 for unlocking a tag in accordance with a specific embodiment of the present disclosure. Method 400 begins at block 402 where a transaction request is received at interconnect controller 114. The flow proceeds to block 404 where interconnect controller 114 initiates a transaction. Tag module 115 provides a tag, which is selected from a set of available tag values and this tag is associated with the transaction. The flow proceeds to block 406 where interconnect controller 114 waits for a response to the transaction. The flow proceeds to decision block 408 where tag control module 229 determines whether a response to the transaction is overdue, based on time information maintained at transaction timer 208. If a response to the transaction is not yet delinquent, the flow returns to decision block 406 where interconnect controller 114 continues to wait for a response. Alternatively, if no response has been received before a predetermined amount of time has expired, the flow proceeds to block 410 where tag control module 220 locks the tag associated with the transaction by associating the tag with a set of locked tags. The flow proceeds to block 412 where tag control module 220 updates information at storage module 202 to indicate that the tag has been locked.

The flow proceeds to block 414 where tag control module 220 updates tag FIFO 204 with the locked tag value along with time information provided by lock timer 210. The time information identifies when the tag was locked so that tag control module 220 or another device can determine how long the tag has remained locked. The flow proceeds to decision block 416 where tag control module 220 determines whether a criterion for unlocking the tag has been met, as described above. For example, the tag control module 220 can determine that the number of locked tags represented at tag FIFO 204 exceeds a predetermined threshold number of locked tags indicated by watermark register 206. If the number of locked tags is less than the threshold stored at watermark register 206, the flow returns to block 402 where interconnect controller 114 can respond to another transaction. If, however, the number of locked tags represented at tag FIFO 204 has reached the threshold stored at watermark register 206, the flow proceeds to block 418 where tag control module 220 asserts signal INTERRUPT to signal that an excessive number of tags are locked, which could limit the ability of interconnect controller 114 to efficiently exchange information with other devices, such as device 120.

The flow proceeds to block 420 where a processor core, such as processor core 111 can respond to signal INTERRUPT and initiate suitable remedial actions, such as to invalidate the outstanding, delinquent, transaction. The flow proceeds to block 422 where processor core 111 updates information stored at storage module 202 to disassociate the tag with the set of locked tags and instead associate the tag with the set of available tags. In an embodiment, tag control module 220 may unilaterally unlock one or more tags, such as the least recently locked tag, when the number of locked tags at tag FIFO 204 reaches the number of tags specified by watermark register 206.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

For example, in an embodiment, available tags register 2021, reserved tags register 2022, and locked tags register 2023 can be implemented as a single register wherein each tag is associated with a two-bit status field and the state of a particular tag (which of the three mutually exclusive sets the tag is currently associated) is identified using a unique encoding of the two status bits. Another implementation or encoding protocol can be used without departing from the scope of the present disclosure.

In an embodiment, the period of time that must elapse before an outstanding transaction is identified as delinquent can be made programmable. For example, a register included at transaction timer 208 can be configured to store a desired timeout value, and a processor core, such as processor core 111 can access the register via signal DATA. In a similar manner, the threshold value maintained at watermark register 206 can be programmable and configured to provide a suitable number of available tags.

For simplicity of discussion, a tag, and the value associated with the tag, are herein used synonymously. For example, when interconnect controller 114 locks a tag, the tag value cannot be associated with another transaction until the tag is subsequently unlocked.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method, comprising:
   maintaining at a data processing device a set of tag values comprising a set of available tag values, a set of reserved tag values, and a set of locked tag values;
   receiving from a first processor device a first request at an interconnect controller, the first request comprising a request to communicate information via an interconnect of the data processing device;
   in response to receiving the request:
     selecting a first tag value from the set of available tag values, wherein the set of reserved tag values and the set of locked tag values are not available for selection;
     associating the first tag value with the set of reserved tag values; and
     communicating a first transaction request to the interconnect;

in response to determining a first transaction timeout based on a first elapsed amount of time since receiving the first transaction request at the interconnect controller:
  indicating the first transaction timeout to the first processor device; and
  associating the first tag value with the set of locked tag values; and
in response to an unlock event occurring while the first tag value is associated with the set of locked tag values, associating the first tag value with the set of available tag values, wherein determining to unlock a given tag during the unlock event comprises:
  determining a recipient corresponding to the first request is known to respond with a greater latency compared to a response latency of another recipient; and
  providing additional time for the recipient to respond to the first request before initiating the unlock event based on the determining the recipient is systematically slow to respond to requests.

2. The method of claim 1, wherein determining to unlock a given tag during the unlock event further comprises receiving a transaction response associated with the first transaction request after the first transaction timeout.

3. The method of claim 1 wherein determining to unlock a given tag during the unlock event further comprises determining a second amount of time has elapsed since associating the first tag value with the set of locked tag values.

4. The method of claim 1, wherein determining to unlock a given tag during the unlock event further comprises determining a number of tag values associated with the set of locked tag values exceeds a threshold value.

5. The method of claim 4, wherein the threshold value is programmable.

6. The method of claim 1, wherein determining to unlock a given tag during the unlock event further comprises receiving a request from a first software application to unlock the first tag value.

7. The method of claim 1, wherein determining to unlock a given tag during the unlock event further comprises receiving a transaction response associated with the first transaction request after the first transaction timeout.

8. The method of claim 1, wherein the additional time is variable and based on the latency of the recipient.

9. A method, comprising:
in response to receiving a first request at an interconnect controller of a data processing device:
  determining a set of available tag values;
  selecting a first tag value from the set of available tag values;
  associating the first tag value with a set of reserved tag values; and
  communicating a first transaction request to an interconnect;
in response to determining the first transaction request has been pending at the interconnect controller for a first period of time indicated by a first hardware timer:
  associating the first tag value with a set of locked tag values; and
in response to a first unlock event, associating the first tag value with the set of available tag values;
wherein determining to unlock a given tag during the first unlock event comprises:
  determining a response to the first transaction request has not been received;
  determining an expected latency of a transaction recipient associated with the first request; and
  providing additional for the recipient to respond to the first request before initiating the unlock event based on the determining the expected latency of the recipient.

10. The method of claim 9, further comprising:
in response to receiving a second request at the interconnect controller after the first transaction request has been pending for the first period of time, and prior to the unlock event:
  determining the set of available tag values, the set of reserved tag values, and the set of locked tag values;
  selecting a second tag value from the set of available tag values;
  associating the second tag value with the set of reserved tag values;
  communicating a second transaction request to the interconnect, the second transaction request associated with the second tag value;
in response to determining the second transaction request has been pending at the interconnect controller for the first period of time:
  associating the second tag value with the set of locked tag values; and
in response to a second unlock event, associating the tag value with the set of available tag values.

11. The method of claim 10, wherein the second unlock event comprises determining the second tag value has been associated with the set of locked tag values for a third period of time, the third period of time different from the second.

12. The method of claim 11, wherein the second unlock event comprises determining a number of tag values associated with the set of locked tag values exceeds a threshold value.

13. The method of claim 12, wherein the threshold value is programmable.

14. The method of claim 11, wherein the second unlock event comprises receiving a request from a first software application to unlock the first tag value.

15. The method of claim 9, wherein the first unlock event further comprises receiving a transaction response to the first transaction request.

16. The method of claim 9, further comprising:
in response to receiving a second request at the interconnect controller after the first request, and in response to determining the first tag value is associated with the set of available tag values, communicating a second transaction request to the interconnect, the second transaction request associated with the first tag value.

17. The method of claim 9, wherein determining to unlock a given tag during the unlock event further comprises determining a second amount of time has elapsed since associating the first tag value with the set of locked tag values.

18. A device, comprising:
a first processor device comprising an output to provide a first request;
an interconnect;
a first storage module operable to store a set of status indicators, the status indicators operable to indicate a set of available tag values, a set of reserved tag values, and a set of locked tag values;
a first timer operable to store a first timer value indicative of a first elapsed time;
an interconnect controller comprising a first input/output port coupled to the first processor device and a second input/output port coupled to the interconnect, the interconnect controller, in response to receiving the first request, operable to:
  select a first tag value from the set of available tag values and associate the first tag value with a first transaction request, wherein the set of reserved tag values and the set of locked tag values are not available for selection;
  configure the set of status indicators to associate the first tag value with the set of reserved tag values;

communicate the first transaction request to the interconnect; and in response to determining a first transaction timeout for the first transaction request based on the first timer value:
- indicate the first transaction timeout to the first processor device; and
- configure the set of status indicators to associate the first tag value with the set of locked tag values; and in response to an unlock event, configure the set of status indicators to associate the first tag value with the set of available tag values, wherein determining to unlock a given tag during the unlock event comprises:
- determining a response to the first transaction request has not been received;
- determining an expected latency of a transaction recipient corresponding to the first request; and
- providing additional time for the recipient to respond to the first request before initiating the unlock event based on the determining the expected latency of the transaction recipient.

19. The device of claim 18, further comprising a second hardware timer, wherein determining to unlock a given tag during the unlock event further comprises determining at the second hardware timer that a second period of time has elapsed since associating the first tag value with the set of locked tag values, the second period of time programmatically variable.

20. The device of claim 18, wherein the additional time is variable and based on the expected latency of the recipient.

* * * * *